March 8, 1966  A. F. REID ETAL  3,238,985

THREADED DEVICES WITH ANTIROTATIONAL MEANS

Filed May 9, 1963  2 Sheets-Sheet 1

INVENTORS
ALLEN F. REID
ALBERT H. HALFF
BY Frank C. Bower
their ATTORNEY

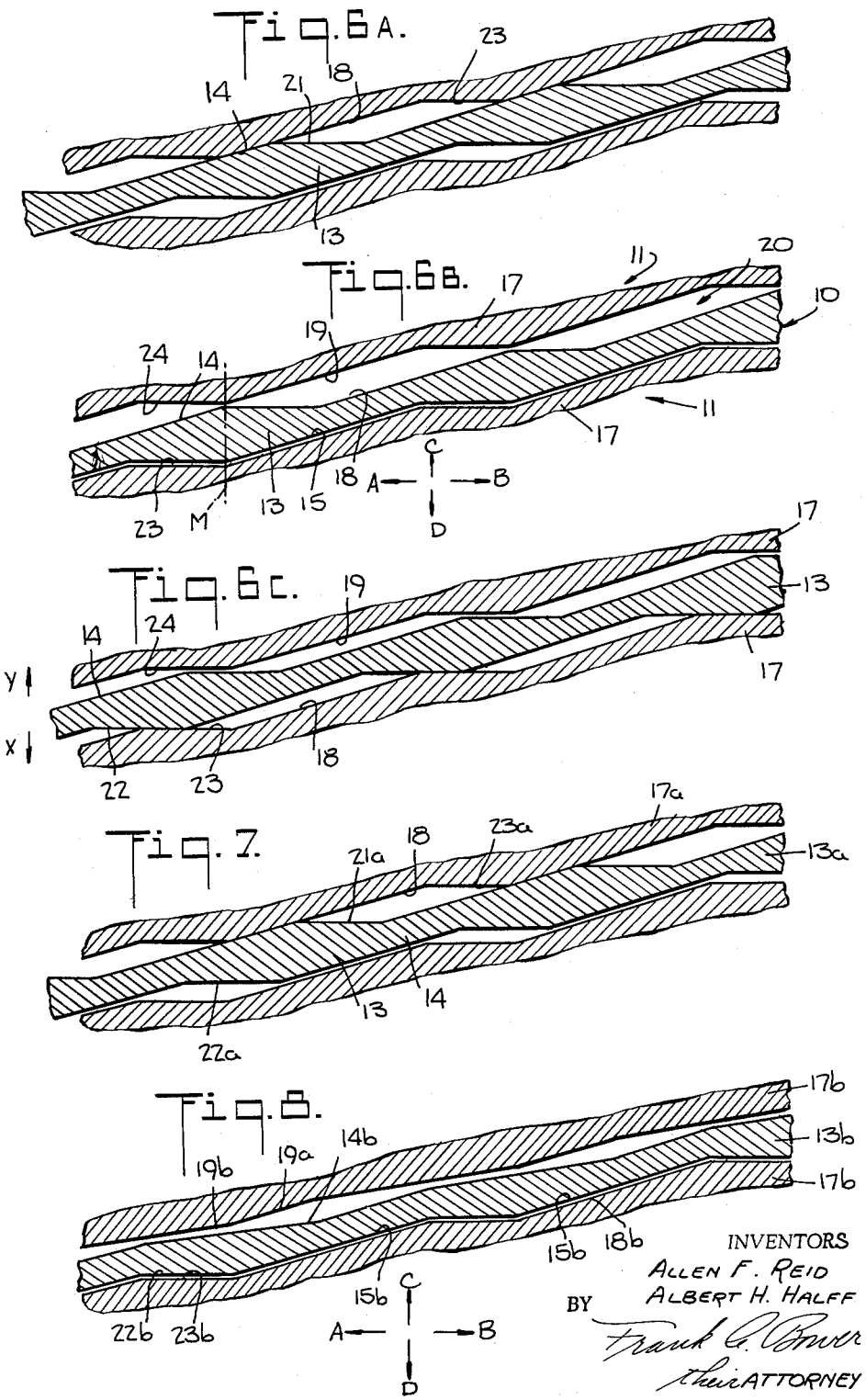

United States Patent Office 3,238,985
Patented Mar. 8, 1966

3,238,985
THREADED DEVICES WITH ANTIROTATIONAL MEANS
Allen F. Reid, 3145 Spur Trail, and Albert H. Halff, 4591 Rheims Place, both of Dallas, Tex.
Filed May 9, 1963, Ser. No. 279,191
2 Claims. (Cl. 151—14)

This invention relates to antirotational means on members of a threaded pair of fastening or translation devices to prevent rotation of one member of the pair in relation to the other at given positions due to axially applied forces.

The threads of a threaded pair are helically formed around the central axis of the pair so that on relative rotation of the members of the pair relative axial movement occurs. Due to the slope of the threads in relation to the axis an axial force applied to a member has a rotational component at an angle to the thread which causes rotation of one member in relation to the other. This rotation usually causes a displacement or loosening of the two members and is objectionable. Various means have been provided to prevent such rotation so that the nut and bolt remain in the set or given position. The friction between the threads may be sufficient to prevent rotation, but it is not adequate on vibratory installations or where the members of the pair are frequently adjusted. Adhesives may be used or the threads jammed when the relationship of the members of the pair is not to be changed. Third elements may be inserted between the members of the pair or longitudinal keys inserted to prevent rotation. It is desirable to avoid these methods and provide means for preventing rotation that can be formed as part of the threads of the members so as to provide an automatic stabilization of the position of the members of the threaded pair.

An object of this invention is to provide the threads of a threaded pair with means to prevent rotation of the members of the threaded pair in a set position due to the application of axial forces.

Another object of the invention is to provide antirotational means to axial forces on the threads of a threaded pair without deformation of the threads or utilization of a third element.

Figure 1:
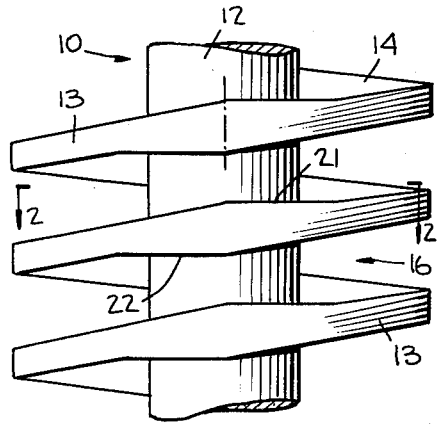
Figure 4:
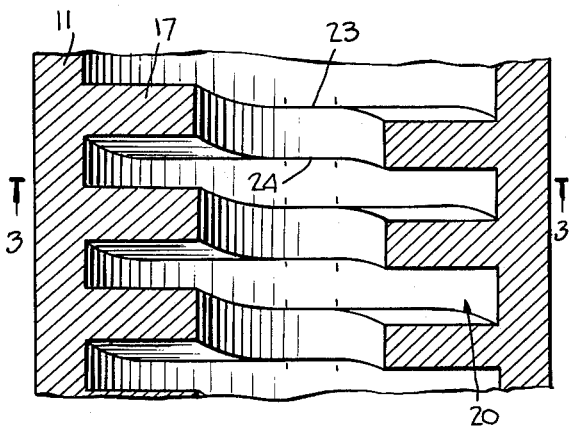
Figure 2:
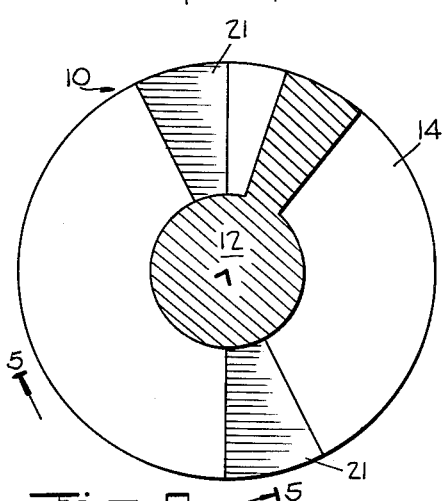
Figure 3:
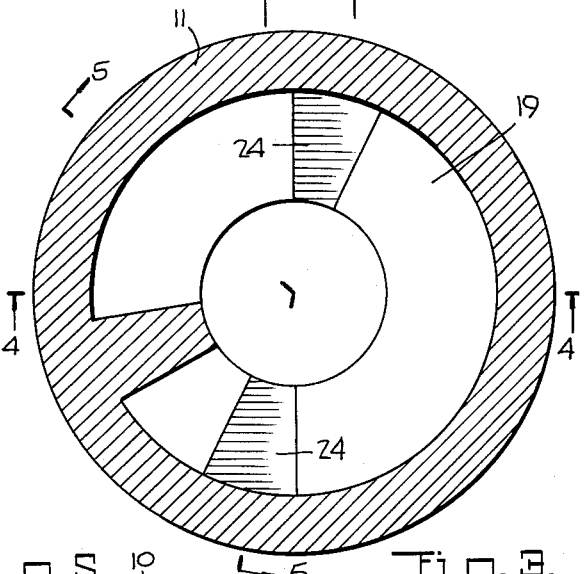
Figure 5:
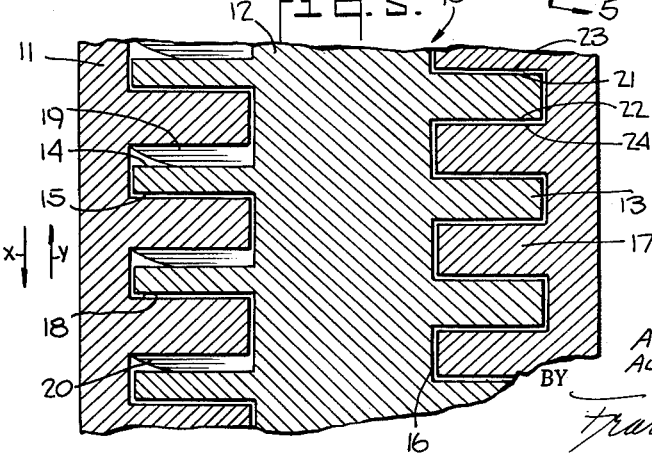

Other and further objects and advantages will be apparent from the description taken in connection with the drawings, in which FIG. 1 is a side view of a threaded shaft or bolt;
FIG. 2 is a sectional view of the bolt taken along lines 2—2 of FIG. 1;
FIG. 3 is a sectional view of the nut taken along lines 3—3 of FIG. 4;
FIG. 4 is a sectional view of the nut taken along lines 4—4 of FIG. 3;
FIG. 5 illustrates a nut section and bolt together with the bolt and nut taken along section lines 5—5 of FIGS. 2 and 3;
FIGS. 6a, b, c are enlarged diagrammatic views of the threads of the nut and bolt in a single plane in three different relationships;
FIG. 7 illustrates modification of the threads of the nut and bolt with the antirotational means at an angle extending below the plane normal to the axis of the threads; and
FIG. 8 is another modification of the nut and bolt with antirotational means only in one set of the facing surfaces of the nut and bolt.

Referring to the drawings, a threaded shaft or bolt 10 and a threaded nut or sleeve 11 form the members of a threaded pair with the bolt 10 fitting within the nut 11. The bolt 10 has an inner shaft 12 and a helical thread 13. The thread 13 has an upper helical surface 14 and a lower helical surface 15 both extending radially from the shaft 12. The surfaces 14 and 15 form a helical groove 16 between turns of the thread 13. The nut 11 has a thread 17 with an upper helical surface 18 and a lower helical surface 19 forming the helical groove 20 between them. The threads 13 of the bolt and 17 of the nut match with the surface 14 on the bolt facing the surface 19 on the nut and the bolt surface 15 facing the surface 18 of the nut.

At uniformly spaced intervals the helical surface 14 of the bolt thread has antirotational surface segments 21 which are perpendicular to the axis of the bolt 10. The surface segments 21 may extend over an arc of 5 to 30 degrees or more. The lower surface 15 has similar antirotational surface segments 22 in a plane normal to the axis of the bolt 10.

As illustrated in FIG. 1 the antirotational segments 21 and 22 are circumferentially offset. Segment 21 commences at the axial point where segment 22 ends. As illustrated in FIGS. 1 and 6a–c segments or portions 21 are to one side of an axially parallel line M and segments or portions 22 are to the other side of the line M. The surface segments are flat and normal to the central axis of the bolt and extend from the shaft 12 to the periphery of the thread 13. The edges of the segments formed with the helical portion of the thread extend radially.

Each turn of the thread 17 on the nut 11 has antirotational surface segments 23 in surface 18 and antirotational surface segments 24 in surface 19 corresponding in number to and the matching surface segments 21 and 22. As distinguished from the segments 21 and 22 of the bolt on the bolt, the segments 23 and 24 are axially aligned (FIGS. 4 and 6a–c). The bolt and nut match and the nut 11 is threaded onto the bolt 10 with the segments moving in and out of registry as the nut is turned. Two or more segments may be provided on each turn with the segments or flat portions on a helical surface being evenly spaced at even fractions of 360° so that the flat segments on the same thread surface are axially aligned. If the nut is being forced in the direction X (FIG. 5), the surface 14 of the bolt will bear against the surface 19 of the nut and the segments 21 will register with the segments 24. The segments are of the same size so that they are co-extensive and when they are in matching relation these are the surfaces of engagement between the nut and the bolt. Any axial force between the nut and the bolt will be transmitted only through these segments and bear normal to the thread. No rotational component tending to loosen the nut and bolt or change the position of the nut will be produced.

In FIGS. 6a–c three positions of the thread 13 of the bolt are illustrated in relation to the thread 17 of the nut. In FIG. 6a the antirotational surfaces 21 and 22 are spaced from surfaces 23 and 24 so that the surface 14 is contacting surface 19 and surface 15 is contacting surface 18. Thus axial pressure in either direction will tend to produce rotation of the nut. In FIG. 6b the surface 22 is engaging surface 23 and axial pressure transmitted through these surfaces will not have a rotational component. Axial pressures through surfaces 14 and 19 will produce rotation. In FIG. 6c surfaces 22, 23 are in engagement and surfaces 21 and 24 are in engagement so that axial pressure in either direction will result in no rotational component. Thus the nut and bolt are stabilized in each direction.

Considering this in greater detail, the antirotational segments 22 of the bolt are in registry with the antirotational segments 23 of the nut since the nut is being forced or held in direction X by the bolt. The movement of the nut in direction A will further tighten the nut and increase the holding force. Movement in direction B will loosen the nut and reduce the holding force. An axial force on the nut in direction C will force the nut to the right causing a loosening or movement in direction Y. With the antirotational segments in registry, the axial force has no rotational component. Movement in direction A of the nut will meet with resistance and thus not occur. Movement of the nut in direction B separates the sloped or helical surfaces so that any rotational force cannot act to loosen the nut. Thus the nut or bolt is stabilized.

If the bolt is pressing in direction Y then the antirotational segments 21, 24 are in registry. Movement in direction B causes tightening and movement in direction C produces loosening. Thus movement in direction A separates the sloped surfaces so that a rotational component is not produced and the nut and bolt are stabilized.

If the slope of the surfaces 13, 14 and 18, 19 is considered to be positive, the slope of the surfaces 21, 22, 23, 24 is zero. In FIG. 7 the surfaces 21a, 22a, 23a, 24a are negatively sloped or sloped counter to the slope of the respective surfaces 13, 14, 18 and 19. Thus a tightening rotational component is created by an axial force.

The threads of the nut and bolt may be modified to lock in one direction only by omitting the antirotational surfaces on one of the facing surfaces, as illustrated in FIG. 8. The helical surfaces 19b and 14b do not have the antirotational surface segments and are interrupted by positively sloped surfaces 19c and 14c. Thus an axial force in direction D on the nut would turn the nut in direction A, and a force in direction C would cause the threads to lock and prevent loosening of the nut by the antirotational surface segments 22b and 23b in the surfaces 15b, 18b engaging.

In describing the foregoing embodiment, for clarity and ease of description, the inner member has been referred to as a bolt and the outer member has been referred to as a nut. However, it is understood that the inner and outer members may be a threaded stud and a tapped hole, a threaded pipe and the end cap or union, or any other similar type of threaded pairs. A translating mechanism may be formed with a threaded shaft and an outer member each having the antirotational surfaces to hold the relative positions of the shaft and member at a desired setting.

As a fastening device the nut may be tightened on the bolt placing the bolt under tension. The axial tension force in addition to vibrational forces places an axial pressure on the threads, which on normal threads would cause the nuts to loosen. With the antirotational surfaces as previously described the nut will stabilize and retain the secured position. If a continuous axial pressure is not applied to the nut there may be a tendency for the nut to respond to incidental rotational forces and move away from the antirotational position. Under such circumstances a spring washer may be used to provide a continuous axial pressure for holding the nut in position. In the case of extreme vibratory conditions the pitch of the antirotational surface may be slightly negative in relation to the pitch of the threads. This prevents any rotational wandering of the nut, since the negative slope imparts an opposite rotational force to that of the thread and holds the nut in the most stable position.

Although the invention has been described in relation to particular types of threaded pairs, it may be applied to other types as well. Instead of the threaded pairs having single threads, double or triple threads may be provided on each member of the threaded pair. Also, in the drawings only square threads are illustrated. It is, of course, understood that any thread shape may be used that is compatible with the stabilizing or antirotational portions. Also in the drawings two stabilized portions per turn are illustrated. However, more than two may be provided on each turn.

Various other modifications and changes may be made in the embodiments without departing from the invention as set forth in the appended claims.

We claim:
1. A fastening device comprising in combination a bolt having a continuous external helical thread with two smooth helical surfaces on opposite sides thereof, said helical surfaces having uniformly spaced antirotational surface portions over the entire length thereof having a slope relative to the axis of the bolt within a range between zero and a slight angle inclined in a direction opposite to that of the helical thread, said antirotational portions extending over a substantial arc with the arc of helical surface therebetween being substantially greater than the arc of the antirotational surface, said bolt antirotational surface portions on one side surface being axially and circumferentially offset to the immediately opposite bolt antirotational surface portions on the other side of the thread with the leading ends of the antirotational surfaces on one side surface of the thread being axially aligned with the trailing ends of the antirotational surfaces on the opposite side surface of the thread, a nut having a continuous internal helical thread with two smooth helical surfaces on opposite sides thereof, said nut helical surfaces having uniformly spaced antirotational surface portions over the entire length thereof with a slope substantially the same as that of the bolt antirotational surface portions and being of substantially the same circumferential extent as said bolt antirotational surface portions, said nut antirotational surface portions on one side being axially aligned with the immediately opposite nut antirotational surface portions on the other side of the thread, said nut and bolt intermeshed with each of the bolt side surfaces facing a respective nut side surface to form two sets of facing side surfaces, the antirotational portions of the facing side surfaces coinciding at given positions of the nut and bolt to form the sole axial force transmitting means between said nut and bolt for a given coinciding position.

2. The combination of a nut and bolt each having a continuous helical thread with smooth, helically advancing surfaces on opposite sides of a respective thread to form two sets of facing surfaces between the threads on intermeshing wherein the load-bearing set of said facing surfaces has antirotational surface portions on each surface, said antirotational surface portions of each surface extending over a substantial arc with the arc of the helical surface therebetween being considerably greater than the arc of the antirotational portions and being uniformly spaced along the entire length of the surfaces to simultaneously coincide on relative rotation of said nut and bolt and having a slope relative to the central axis of said nut and bolt within a range between zero and a slight angle inclined in a direction opposite to and being less than the angle of inclination of the helical surfaces to form the sole axial force transmitting means between said nut and bolt without a positive rotational component so that said nut and bolt retain the coinciding position on application of axial forces.

References Cited by the Examiner
UNITED STATES PATENTS

| 113,557 | 4/1871 | Pearson | 151—14 |
| 2,202,868 | 6/1940 | Reohr | 151—22 |
| 2,867,786 | 1/1959 | Doetsch | 151—22 |

FOREIGN PATENTS 233,119  3/1961  Australia.

CARL W. TOMLIN, Primary Examiner.

EDWARD C. ALLEN, Examiner.